United States Patent
Huang et al.

(10) Patent No.: US 7,411,705 B2
(45) Date of Patent: Aug. 12, 2008

(54) LIGHT-SOURCE MECHANISM FOR OPTICAL SCANNER

(75) Inventors: Yin-Chun Huang, Hsinchu (TW); Po-Hua Fang, Taipei (TW); Shu-Ya Chiang, TaiChung (TW)

(73) Assignee: Transpacific IP, Ltd., Taipei (TW)

( * ) Notice: Subject to any disclaimer, the term of this patent is extended or adjusted under 35 U.S.C. 154(b) by 809 days.

(21) Appl. No.: 10/308,727

(22) Filed: Dec. 3, 2002

(65) Prior Publication Data

US 2004/0105269 A1    Jun. 3, 2004

(51) Int. Cl.
*H04N 1/04* (2006.01)

(52) U.S. Cl. ..................... 358/475; 358/474

(58) Field of Classification Search .......... 358/475, 358/509, 496, 484, 474, 497, 487, 505, 506, 358/483, 482, 512–514; 250/208.1, 216, 250/234–236, 205, 239; 399/221, 220, 211, 399/212; 382/312, 318, 319; 362/390
See application file for complete search history.

(56) References Cited

U.S. PATENT DOCUMENTS

| | | | | |
|---|---|---|---|---|
| 5,606,430 A * | 2/1997 | Morikawa et al. | ........... | 358/498 |
| 6,424,435 B1 * | 7/2002 | Kao | ........................ | 358/497 |
| 6,641,281 B2 * | 11/2003 | Cheng | ...................... | 362/217 |
| 6,654,149 B1 * | 11/2003 | Sheng | ........................ | 358/474 |
| 2004/0012970 A1 * | 1/2004 | Huang et al. | ................ | 362/390 |

FOREIGN PATENT DOCUMENTS

| | | | |
|---|---|---|---|
| JP | 58078172 A1 * | 5/1983 | |
| JP | 6163832 A1 * | 4/1986 | |
| JP | 5224317 A1 * | 9/1993 | |

* cited by examiner

*Primary Examiner*—Cheukfan Lee
(74) *Attorney, Agent, or Firm*—Stolowitz Ford Cowger LLP

(57) ABSTRACT

A light-source mechanism for an optical scanner includes a chassis, a lamp, a lamp holder and a buffering device between the chassis and the lamp holder. If the buffering device is subjected to an external force of impact and vibration, the buffering device may effectively absorb the influence of the external force, such that the lamp generally will not be damaged.

23 Claims, 3 Drawing Sheets

LIGHT-SOURCE MECHANISM FOR OPTICAL SCANNER

FIELD OF THE INVENTION

The invention relates to an improvement of the light-source mechanism for an optical scanner, especially to a kind of invention used for the light-source mechanism in an optical scanner.

BACKGROUND OF THE INVENTION

Accordingly, the development of computer industry is so rapid, not only has the CPU (i.e., Central Processing Unit) processing speed of a computer exceeded 2 GHz, but also computer accessories have progressed toward the goals of lightness, thinness, shortness, and smallness. In the meantime, because of the prevalence of the computer internet or Local Area Networks (LAN); the requirement for making a home page has increased significantly and, when making a home page, a scanner is an indispensably important instrument. The action principle of a scanner is first to place a document into the scanner, wherein the image data of the document is transferred to a lens and CCD (i.e., Charge-Coupled Device) through a specific length of an optical path, then the image of the document is converted into electronic data, which is stored in a storing device of a computer (such as hard disk, optical disc, . . . , etc.), such that after scanning the electronic data may be edited, processed, and applied, so the scanner is an indispensable device for a computer accessory in the business of making a home page or editing a document.

Please refer to FIG. 1, which is a prior art that applies a fixing structure 25 in the two sides of a lamp holder 2 for directly fixing a lamp 3 and the lamp holder 2 into the bucking hole (not shown in the figure) of a chassis 1 (a portion of which is shown in the figure). The interior of the chassis not only may accommodate the lamp 3, but also has a plurality of reflection mirrors, a lens, and a CCD. Because the internal components of the chassis 1 belong to the prior arts of a common scanner, they will not be repetitiously described herein. Additionally, the lamp holder 2 not only has the function of fixing the lamp 3, but also a reflection surface (not shown in the figure) is arranged in the concave accommodating groove of the lamp for providing a specific direction and area of the emission of the light source of the lamp 3, which enhances the intensity of the light source.

However, it is impossible for above-said fixing structure to provide a buffering structure for the lamp 3 and the lamp holder 2 so, in a moving procedure of the scanner, when the scanner is dropped down to the ground because of carelessness, all the vibrating force will be concentrated upon the lamp 3 and the lamp holder 2. Since the technique for making the lamp 3 is quite precise—the specification of the diameter of some lamp 3 is only around 0.16 cm and its hardness and toughness are relatively weak—so it is easy for the lamp to break. Therefore, the invention is a solution for this problem, wherein a buffering device is provided between the chassis and the lamp holder, such that the lamp generally will not break because of the vibration of an external force.

SUMMARY OF THE INVENTION

In order to solve the shortcoming of the prior arts described thereinbefore, the invention is an improvement of the light-source mechanism for an optical scanner. The main objective of the invention is to provide a buffering device between the chassis and the lamp holder and, when the buffer is subjected to an external force of impact and vibration, it may effectively absorb the influence of the external force, such that the lamp will not be damaged and the completeness of the lamp may be maintained.

Preferably, in the connecting space between the chassis and the lamp holder, a spring piece is formed by integrating with the chassis as one body, such that it may effectively avoid the lamp to be impacted by the external force or be influenced by the vibration.

Preferable, in the connecting space between the chassis and the lamp holder, a rubber block may be appropriately placed in, such that it may effectively avoid the lamp to be impacted by the external force or be influenced by the vibration.

Preferable, in the connecting space between the chassis and the lamp holder, a sponge may be appropriately placed in, such that it may effectively avoid the lamp to be impacted by the external force or be influenced by the vibration.

Preferable, in the connecting space between the chassis and the lamp holder, a spring may be appropriately placed in, such that it may effectively avoid the lamp to be impacted by the external force or be influenced by the vibration.

For your esteemed reviewing committee to further understand the operational principle and the other function in a more clear way, a detailed description in cooperation with corresponding drawings are presented as follows.

DETAILED DESCRIPTION OF THE INVENTION

A detailed structure in matching with the corresponding drawings and its connection relationship are presented as the following for facilitating your esteemed reviewing members in understanding the present invention.

Figure 1:
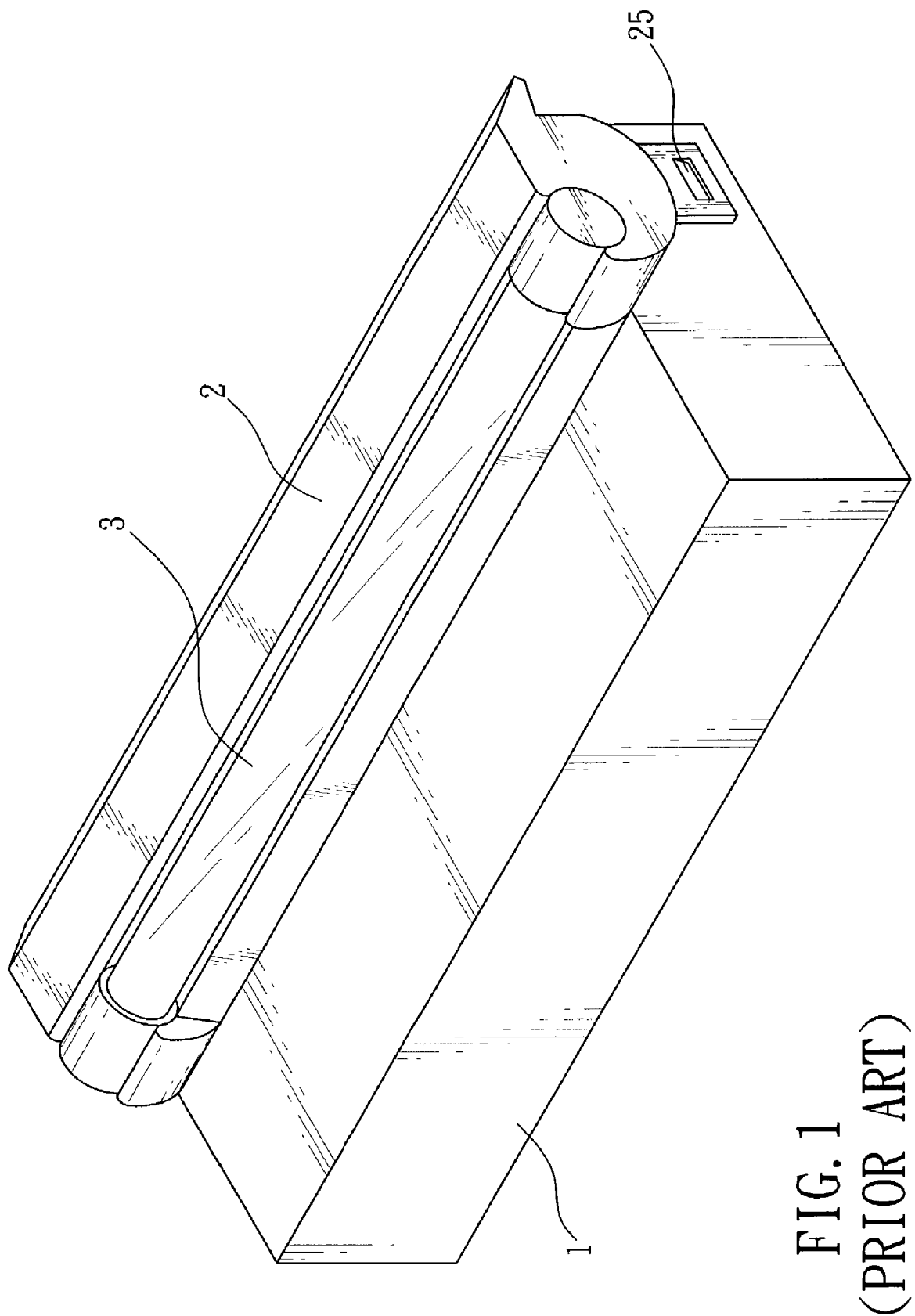
FIG. 1 is a 3-D structure view for the chassis and the lamp holder according to the prior arts.
Figure 2:
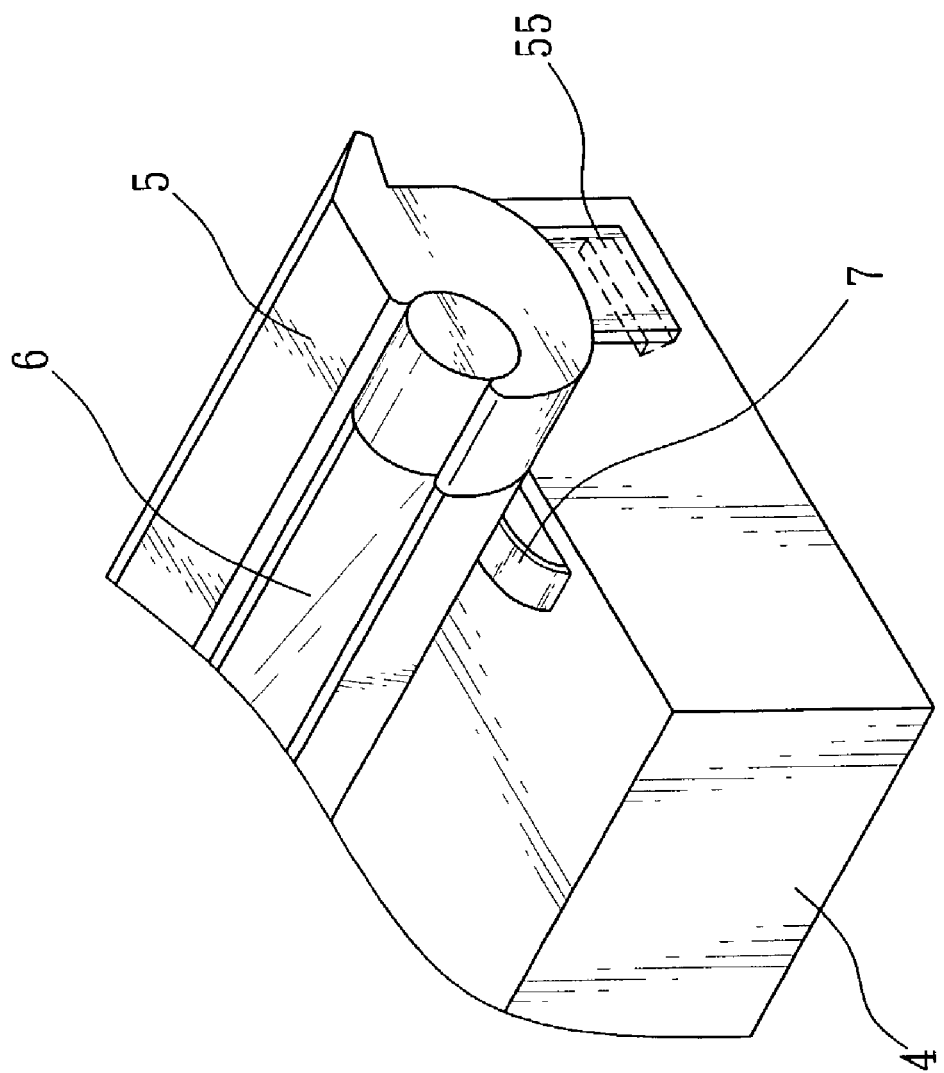
FIG. 2 is an illustration for the first embodiment for adding a buffering device between the chassis and the lamp holder according to the invention.

Please refer to FIG. 2, which is an illustration for the first embodiment for adding a buffering device between the chassis and the lamp holder according to the invention, wherein a fixing structure 55 extended along two sides of a lamp holder 5 for directly fixing a lamp 6 and the lamp holder 5 into the buckling hold (not shown in the figure) of a chassis 4 (a portion of which is shown in the figure). The interior of the chassis not only may accommodate the lamp 6, but also has plurality of reflection mirrors, a lens and a CCD. Additionally, the lamp holder 5 not only has the function for fixing the lamp 6, but also a reflection surface (not shown in the figure) is arranged in the concave accommodating groove of the lamp for providing a specific direction and area of the emission of the light source of the lamp 6, and also enhances the intensity of the light source.

Besides the above structure, the invention specially provides a spring piece 7, which is a plastic material and formed integrally as one body with a chassis 4, between the chassis 4 and the lamp holder 5. The optimal places for arranging the spring piece 7 are the fixing places of the two sides of the lamp 6. Of course, the arranging place and the arranging number of the spring piece 7 may be adjusted and varied appropriately according to the different requirements, such as applying a spring piece 7 of large size to be arranged at the central place of the lamp 6, or applying plural spring pieces 7 of small size to be uniformly distributed in the space between the lamp 6 and the chassis 4. The spring piece 7 has the characteristics of elastic extension and contraction so, when the spring piece 7 is impacted by an external force and a vibration is generated, the spring piece 7 may absorb the external force and avoid the influence acting on the lamp 6 and the lamp holder 5, such that the lamp 6 generally will not be damaged and its completeness may also be maintained.

Figure 3:
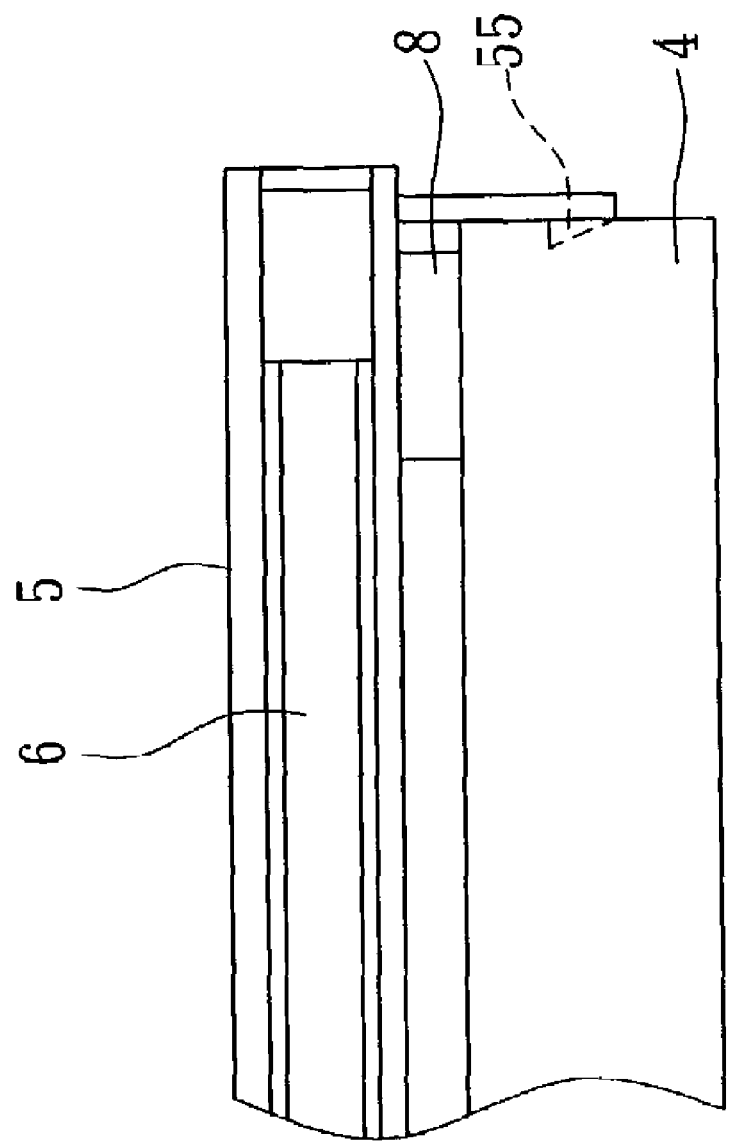
FIG. 3 is an illustration for the second embodiment for adding a buffering device between the chassis and the lamp holder according to the invention.

Please refer to FIG. 3, which is an illustration for the second embodiment for adding a buffering device between the chassis and the lamp holder according to the invention. Besides the components and the assembling structure of the chassis 4, the lamp holder 5, and the lamp 6 disclosed in FIG. 2, the invention specially provides a buffering device 8 between the chassis 4 and the lamp holder 5, and the optimal places for arranging the buffering device 8 are the fixing places of the two sides of the lamp 6. Of course, the arranging place and the arranging number of the buffering device 8 may be adjusted and varied appropriately according to the different requirements. The buffering device 8 may be a piece of rubber block, sponge, or elastic spring, etc., while the buffering device 8 is not restricted to the exemplified device. Any material that may absorb vibration or have the characteristics of elastic extension and contraction is all belonged to the application field of the invention. Therefore, when the buffering device 8 is impacted by an external force and a vibration is generated, the buffering device 8 absorbs the external force and generally avoids the influence acting on the lamp 6 and the lamp holder 5, such that the lamp 6 generally will not be damaged and its completeness may be also maintained.

From the structure disclosed from FIG. 2 and FIG. 3, it may understand the main merits of the present invention is to provide a buffering device between the chassis and the lamp holder, while the buffering device is not necessarily an externally added structure, but also it may be a configuration that is a plastic material and is formed integrally with the chassis or the lamp holder as one body. All these variations belong to the claimed ranges of the present invention. By arranging a buffering device, it may really reduce the damaging probability of the lamp because of an external force. For the industry, the invention indeed has the value to be existed, so a patent application is proposed herein for seeking a protection by patent authority.

What is claimed is:

1. A scanner comprising:
    a lamp holder having two ends;
    fixing structures rigidly attaching the ends of the lamp holder to a chassis of the scanner; and
    buffering devices located adjacent to the rigid fixing structures in a space between the lamp holder and the chassis, the buffering devices separate from the rigid fixing structures such that the lamp holder is connected to the chassis independently of the buffering devices;
    wherein the lamp holder is rigidly attached to the chassis such that vibration transfer from the chassis is dampened by the separate buffering devices, said rigid attachment combined with the dampening by the separate buffering device operable to minimize movement of the lamp holder both to and away from the chassis if the scanner is dropped.

2. The scanner of claim 1 wherein the lamp holder has a convex bottom surface and the buffering devices having convex top surfaces to engage the convex bottom surface of the lamp holder.

3. The scanner of claim 2 wherein an apex of each convex top surface of the buffering devices engages a portion of the convex bottom surface that is closest to the chassis.

4. The scanner of claim 1 wherein the buffering devices contact the lamp holder and are non-attached to the lamp holder.

5. The scanner of claim 4 wherein the buffering devices are integrally formed with the chassis.

6. The scanner of claim 5 wherein each buffering device comprises at least one selected from the group including a spring structure, a rubber structure, plastic structure and a sponge structure.

7. The scanner of claim 6 wherein the rigid fixing structures mate with buckling holes defined by the chassis to secure the lamp holder to the chassis.

8. A method comprising:
    rigidly attaching a lamp holder to a chassis of an optical scanner using an attachment structure, said attachment structure forming an opening between the lamp holder and the chassis; and
    providing at least one buffering device in the opening between the lamp holder and the chassis, wherein the buffering device is adjacent to the attachment structure but separate from the attachment structure.

9. The method of claim 8 wherein the buffering device has a curved surface adjacent to the lamp holder and the buffering device is positioned so that the curved surface engages a curved surface of the lamp holder.

10. The method of claim 9 wherein the curved surfaces only partially contact each other.

11. The method of claim 8 wherein the buffering device is integrally formed with the chassis.

12. The method of claim 11 wherein the lamp holder is attached to the chassis by moving the lamp holder toward the chassis until protrusions on the attachment structure mate with holes in the chassis, said movement causing a bottom surface of the lamp holder to engage a surface of the buffering device.

13. The method of claim 12 wherein said engagement applies a normal force against the lamp holder in a direction away from the chassis, the normal force at least partially supporting the lamp holder and securing the protrusions in the holes.

14. The method of claim 13:
    wherein the buffering device is at least partially compressed if the protrusions of the attachment structure are mated with the holes, said partial compression contributing to the normal force;
    wherein protrusions have the shape of a right triangle with one side of the right triangle oriented substantially parallel to a bottom surface of the lamp holder, the right angle triangle side engaging with a side of the opening to at least partially counter the normal force caused by the compression;
    wherein said opposed countering force in combination with the normal force secures a position of the lamp holder relative to the chassis.

15. An optical scanner, comprising:
    means for holding a lamp, the lamp holding means having two ends and a bottom surface;
    means for rigidly fixing the lamp holding means to a chassis of the optical scanner; and
    means for dampening the transfer of vibration from the chassis to the lamp holding means, the dampening means located in a space between the lamp holder and the chassis, the dampening means having at least one top surface to engage the bottom surface.

16. The optical scanner of claim 15 wherein the fixing means is integrally formed with the lamp holder and the optical scanner further comprises:

buckling means formed on the fixing means, the buckling means including triangular-shaped tabs mating with buckling holes defined by the chassis;

wherein the dampening means is at least partially compressed if the triangular-shaped tabs are mated with the buckling holes, the partial compression of the dampening means producing a first normal force acting on a bottom surface of the lamp holder, the first normal force at least partially countering an opposed second normal force acting on a top surface of the triangular-shaped tabs to secure the lamp holding means to the chassis, the opposed forces securing a position of the lamp holding means relative to the chassis.

17. The optical scanner of claim 15 wherein the dampening means comprises two buffering devices located adjacent to ends of the lamp holding means.

18. The optical scanner of claim 15 wherein the dampening means is integrated with the chassis and the fixing means is integrated with the lamp holding means.

19. The optical scanner of claim 18 wherein the lamp holding means and the integrated fixing means are detachably coupled to the chassis and the dampening means is unattached to said lamp holding means.

20. The optical scanner of claim 15 wherein the dampening means is a rubber structure, a plastic structure, a sponge structure, a spring structure or another compressible structure.

21. The optical scanner of claim 15 wherein the dampening means is structured to dampen the transfer of a vibration caused by the optical scanner being placed on a surface to reduce an amount of the vibration transferred to the lamp holder.

22. The optical scanner of claim 15 wherein the dampening means comprises a single buffering device, the single buffering device positioned adjacent to a center of the lamp holding means.

23. The optical scanner of claim 15 wherein the fixing means in combination with the dampening means is operable to minimize movement of the lamp holding means both to and away from the chassis.

\* \* \* \* \*